(12) United States Patent
Later

(10) Patent No.: US 6,434,951 B2
(45) Date of Patent: Aug. 20, 2002

(54) METHODS FOR HEAT-SHOCKING FRESH PRODUCE AND FOR COOLING SUCH PRODUCE TO A DESIRED TEMPERATURE, AND MOISTURE CONTENT

(76) Inventor: Roger Carson Later, 1427 Euclid St., Santa Monica, CA (US) 90404

( * ) Notice: Subject to any disclaimer, the term of this patent is extended or adjusted under 35 U.S.C. 154(b) by 0 days.

(21) Appl. No.: 09/804,201

(22) Filed: Mar. 13, 2001

Related U.S. Application Data

(63) Continuation-in-part of application No. 09/431,363, filed on Nov. 1, 1999, which is a continuation-in-part of application No. 09/040,139, filed on Mar. 17, 1998, now Pat. No. 5,992,169.

(51) Int. Cl.[7] ......................... F25D 17/02; F25D 25/00; A23B 4/00
(52) U.S. Cl. ............................... 62/64; 62/62; 62/374; 99/470
(58) Field of Search ............................. 62/62, 63, 64, 62/65, 373, 374, 378; 99/467, 470, 483, 517

(56) References Cited

U.S. PATENT DOCUMENTS

| | | | | |
|---|---|---|---|---|
| 3,844,132 A | * | 10/1974 | Miller et al. ................. 62/268 |
| 4,061,483 A | * | 12/1977 | Burg ............................. 62/268 |
| 4,141,224 A | * | 2/1979 | Alger et al. ................... 62/268 |
| 4,407,140 A | * | 10/1983 | Kobayashi .................... 62/268 |
| 4,827,727 A | * | 5/1989 | Caracciolo ...................... 62/63 |
| 4,942,053 A | * | 7/1990 | Franklin et al. ............. 426/524 |
| 5,277,031 A | * | 1/1994 | Miler et al. .................... 62/100 |
| 5,375,431 A | * | 12/1994 | Later et al. .................... 62/268 |
| 5,534,280 A | * | 7/1996 | Welch ......................... 426/321 |
| 5,922,382 A | * | 7/1999 | Powrie et al. .............. 426/324 |
| 5,925,395 A | * | 7/1999 | Chen .......................... 426/321 |
| 5,992,169 A | * | 11/1999 | Later ............................. 62/270 |

* cited by examiner

Primary Examiner—William C. Doerrler
(74) Attorney, Agent, or Firm—Oppenheimer Wolff & Donnelly, LLP

(57) ABSTRACT

The treatment of produce, especially processed produce, such as lettuce, broccoli and potatoes, wherein the produce is heat-shocked with water having an elevated temperature relative to the produce, to minimize discoloration of the produce from the processing, followed by low pressure or vacuum cooling and drying of the produce to remove heat-shock water adsorbed and absorbed by the produce.

59 Claims, 3 Drawing Sheets

Heat Balance Calculations for Water Removal by Vacuum Cooling

Necessary Incoming Produce Temperature °F for Complete Evaporation

| Spray/Immersion Water Temperature °F | Water Adsorbtion Percentage | | |
|---|---|---|---|
| | 5% | 10% | 15% |
| 35 °F | 79.5°F | 128°F | 176.5°F |
| 40 °F | 74.5°F | 123°F | 171.5°F |
| 50 °F | 64.5°F | 113°F | 161.5°F |
| 60 °F | 54.5°F | 103°F | 151.5°F |
| 70 °F | 44.5°F | 93°F | 141.5°F |
| 80 °F | 34.5°F | 83°F | 131.5°F |
| 90 °F | 24.5°F | 73°F | 121.5°F |
| 100 °F | 14.5°F | 63°F | 111.5°F |
| 110 °F | 4.5°F | 53°F | 101.5°F |
| 120 °F | -5.5°F | 43°F | 91.5°F |

FIG. 2A

Heat Balance Calculations for Water Removal by Vacuum Cooling

100 °F Spray/Immersion Water Temperature

| Water Adsorption Percentage: | 5% | 10% | 15% |
|---|---|---|---|
| Spray/Immersion Water Temperature °F | 100 | 100 | 100 |
| Desired Produce Temperature °F | 33 | 33 | 33 |
| Difference in Temperature°F | 67 | 67 | 67 |
| Multiplied by 1 SpHt | 67 | 67 | 67 |
| then, multiplied by 100 lbs produce | | | |
| Equals, BTu's to be removed | 6700 | 6700 | 6700 |
| Divide by; | | | |
| BTu's/lbs water evaporated | 970 | 970 | 970 |
| Equals, Lbs of H$_2$O to cool H$_2$O | 6.91 | 6.91 | 6.91 |
| Moisture adsorption in lbs. | 5 | 10 | 15 |
| Less lbs. of H$_2$O to cool H$_2$O | 6.91 | 6.91 | 6.91 |
| Equals H$_2$O to cool produce | -1.91 | 3.09 | 8.09 |
| Times BTu's/lbs water evaporated | 970 | 970 | 970 |
| Equals, BTu's/100 lbs. produce | -1850 | 3000 | 7850 |
| Divide by; | | | |
| 100 lbs. of produce | -18.5 | 30 | 78.5 |
| Times 1 SpHt, equals ° F Heat Evaporated | -18.5 | 30 | 78.5 |
| Plus; Desired Produce Temperature °F | 33 | 33 | 33 |
| Equals; Necessary Incoming ProduceTemperature °F for Complete Evaporation | 14.50 | 63.00 | 111.50 |

FIG. 2B

METHODS FOR HEAT-SHOCKING FRESH PRODUCE AND FOR COOLING SUCH PRODUCE TO A DESIRED TEMPERATURE, AND MOISTURE CONTENT

RELATED APPLICATIONS

This application is a continuation-in-part of application Ser. No. 09/431,363, filed Nov. 1, 1999, which is a continuation-in-part of Ser. No. 09/040,139, filed Mar. 17, 1998, now U.S. Pat. No. 5,992,169.

FIELD OF THE INVENTION

This invention provides methods for applying controlled elevated temperature water to fresh produce such as lettuce, broccoli and potatoes to create a heat shock response in the produce tissue, and then removing the water and cooling the produce by vacuum evaporation of the water, leaving the produce tissue at a desired temperature and with a desired moisture content.

BACKGROUND OF THE INVENTION

U.S. Pat. No. 5,992,169, incorporated herein by reference as though fully set forth here, discloses vacuum cooling and drying of fresh produce such as lettuce, and apparatus therefor, as an alternative and superior method to centrifuge drying and cooling, or forced air drying and cooling of processed produce. Vacuum cooling and drying requires less handling, and therefore causes less abrasion and abuse of produce tissue, reducing wound response and browning of the tissue, and enhancing marketability.

Produce sprayed or immersed in water absorbs and adsorbs water. For example, Iceberg lettuce immersed in water after being chopped or cut may take up to twenty percent or more of its weight in water. The more water that the lettuce tissue absorbs/adsorbs, the higher the temperature must be to evaporate unwanted water in a given time period, in the vacuum evaporation process. (See FIGS. 2A and 2B).

To minimize lettuce residency time in rinse water without sacrificing produce quality, research has been done to determine what the upper temperature limit of lettuce rinse water could be. Surprisingly, lettuce tissue can withstand rather high air and water temperatures. Warm air or water applied to produce tissues causes a preservation response called a heat-shock response. See Loaiza-Velarde, J. G., Thomas-Barbera, F. A., and Saltveit, M. E., Effect of Intensity and Duration of Heat-shock Treatments on Wound-induced Phenolic Metabolism in Iceberg Lettuce, J. Amer. Soc. Hort. Sci. 122(6):873–877 (1997), incorporated by reference as though fully set forth herein. This response causes physiological changes in produce tissue which, when growing, aids in survival, and, after harvest, preserves marketability. This response causes enzyme changes in lettuce, especially processed lettuce, which can delay or prevent discoloration, e.g. browning, increasing lettuce marketability. (By "processed lettuce" is meant lettuce that has been cut, chopped, shredded and/or cored.) In accordance with the present invention, this ability of produce to withstand elevated water temperatures and, in fact, benefit from this immersion, also provides a synergistic relationship with the vacuum cooling and drying of fresh produce, in that the rinse water removal by vacuum drying, i.e. evaporation, is made more effective or efficient by the elevated starting temperature of the water. In its optimum aspects, the present invention utilizes the synergistic combination of heat shock and vacuum drying and cooling. Nevertheless, the invention contemplates the same synergism by using an elevated temperature rinse water, which may be above the starting temperature of the produce, even though that elevated temperature is less than that which will produce heat shock.

At present, the packaged salad industry utilizes proper cooling, special semipermeable membrane bags, and/or modified gas atmospheres to control the metabolism of plant tissue and to minimize browning of produce, especially processed lettuce. Immersion of such produce in water at a temperature in the range of 50 degrees to 160 degrees Fahrenheit for a suitable time to produce the heat shock response, itself inhibits browning.

For additional information, see the following publications:

1. Brecht, J. K., 1995, Physiology of Lightly Processed Fruits and Vegetables. HortScience 30: 18–22.
2. Bolin, H. R. and Hursoll, C. C., 1991. Effect of Preparation Procedure and Storage Parameters on Quality Retention of Salad-Cut Lettuce, J. Food Sci, 56: 60–67.
3. Couture, R., Cantwell, M. I., Ke, D, and Saltviet, M. E., 1993. Physiological Attributes and Storage Lite of Minimally Processed Lettuce. HortScience 28: 223–725.
4. Ke, D. and Saltviet, M. E., 1988, Plant Hormone Interaction and Phenolic Metabolism in the Regulation of Russet Spotting in Iceberg Lettuce. Plant Physical: 88: 1136–1140.
5. Loaize-Velarde, J., Tomas-Barberan, F. A., Saltviet, M. E., 1997. Effect of Intensity and Duration of Heat Shock Treatments on Wound Induced Phenolic Metabolic in Iceberg Lettuce. J. Amer Soc Hort Science 122(6): 873–877.
6. Lopez Galvez, G, Saltviet, M. E., and Cantwell, M., 1997. Wound Induced Phenylalanine Ammonia Lyase Activity: Factors Affecting its Induction and Correlation with the Quality of Minimally Processed Lettuce. Postharvest Biol Technol 9: 223–233.
7. Pollock, C. F., Eagles, C. F., Howarth, C. J., Schunumann, P. H. D., and Stoudart, J. L., 1993. Temperature Stress P. 109–132 In: L. Fowden, T. Mansfield, J. Stoudart (Eds) Plant Adaptation to Environmental Stress. Chapman and Hall, New York.
8. Saltviet, M. E., 1997. Physical and Physiological Changes in Minimally Processed Fruits and Vegetables. p. 205–220 In: F. A. Tomas Barberan (Ed.) Phytochemistry of Fruits and Vegetables. Oxford University Press, Oxford, UK.
9. Vierling, E., 1991 The Roles of Heat Shock Proteins in Plants. Annu. Rev. Plant Physiol. Plant Mol Biol 42:579–620.

SUMMARY OF THE INVENTION

This invention provides methods for delivering produce especially processed produce such as lettuce, broccoli and potatoes at a desired temperature and a desired moisture content, after the produce has been subjected to a heat shock or other anti-browning treatment. The process of heat-shocking produce, then cooling and drying, can be applied to any produce in need of cooling and drying for shipment or storage, but is especially effective on lettuce, such as Iceberg lettuce.

For most processed produce, and particularly for green leafy produce such as lettuce, where the harvest temperature of the produce is in the range of about 35 degrees to about 90 degrees Fahrenheit, the heat-shock reaction takes place and can be detected when the processed produce is exposed to a temperature about 18 degrees Fahrenheit higher than the harvest temperature of the produce. However, it is important not to heat the produce too much. Proper heat shock treatment therefore depends on the temperature of the produce at the outset of the heat-shock process, the temperature of the water utilized to cause the shock, and the time needed to create the heat-shock response, i.e. BTU's delivered. Preferably, but not necessarily, the produce has a temperature of about 50 degrees Fahrenheit at the beginning of the heat-shock process, but could have a temperature as low as about 33 degrees Fahrenheit. The exposure to higher temperature water, e.g. water at a temperature of about 50 degrees to about 160 degrees Fahrenheit, continues until the heat-shock response has taken place, e.g., for about 30 to 480 seconds. Thereafter, the temperature of the produce is reduced to the range of about 34 degrees to about 41 degrees Fahrenheit, i.e. to a temperature where the metabolism of the produce is slowed substantially without killing the produce.

The processing (cutting, chopping, shredding, and/or coring) of lettuce induces alterations in the phenolic metabolism of the lettuce which causes browning, reducing quality. Phenylalanine ammonia-lyase (PAL) and the concentration of phenolic compounds (e.g. chlorogenic acid, dicaffeoyl tartaric acid and iso-chlorogenic acid) increase in wound areas after processing. This increase in the wound response enzyme activity is reduced when the cut tissue is exposed to a heat-shock environment which redirects the protein synthesis away from a cut-shock response.

The reduction of PAL activity increases with the duration of heat-shock treatment, and the reduction of PAL increases faster as the water temperature increases. PAL activity is barely detected after a 60-second treatment with 155 degree Fahrenheit water. However, heat-shock treatment at a water temperature above 140 degrees Fahrenheit and up to about 155 degrees Fahrenheit for 30 seconds may damage produce tissue. For example, lettuce tissue becomes translucent. Therefore, it is important that the starting temperature of the produce to be heat-shocked be known and, be low enough to prevent over-heating, but not so low as to create undue expense. For the proper conditions of temperature and time, see, generally, the above-cited article by Loaiza-Velarde et al.

Heat-shock protein synthesis redirection differs depending on the nature of the produce. Produce with preformed phenolic compounds, such as artichokes and avocados, will brown after wounding even if subjected to elevated temperatures. However, Iceberg, Red and Green Leaf, Romaine and Butter lettuce, as well as broccoli, all can have their enzyme activity redirected by exposure to hot water. The exposure to heat shock water significantly reduces the PAL activity and associated phenolic activity.

Alternatively or additionally, the water rinse/vacuum cooling process can be utilized to apply anti-browning agents to produce tissue with elevated levels of preformed phenolics like potatoes and apples, and then to cool the produce. These anti-browning agents can be applied evenly in the produce rinse water, which can then be rinsed off before the evaporation process.

Many different methods are available to cool heat-shocked processed produce. For example, forced air cooling is available, but it dries the produce tissue unevenly, resulting in a product that is unappealing to consumers. Centrifuge drying of lettuce is available, but it cannot remove water in precise amounts, and tends to crush the lettuce tissue, resulting in limp leaves, reducing yield, and leaving lettuce that is unappealing. On the other hand, vacuum pressure evenly removes a desired and controlled amount of water, and a desired amount of heat, resulting in more appealing lettuce. It further provides an increased yield per head, as the outermost cap leaves, which are damaged by centrifuges, can be utilized. In evaporative cooling of lettuce, evaporation of about one percent water by weight effects approximately a 10 degree Fahrenheit temperature reduction of the produce.

It may be desired or necessary to conduct the vacuum cooling process in multiple evacuation stages, where the vacuum is released between successive evacuation stages. In that case one may direct the incoming vacuum release air to blow surface water from the produce.

As one illustrative example, consider one thousand pounds of chopped lettuce harvested at 85 degrees Fahrenheit. First, the temperature of the lettuce is reduced to 50 degrees Fahrenheit by vacuum cooling with cold water or with cold air. This cooling ensures that the exposure to a heat-shock environment will not heat the tissue to too high a temperature, causing translucence. Conversely, if the lettuce to be processed has a starting temperature of from about 33 degrees Fahrenheit to about 41 degrees Fahrenheit, this would be acceptable, or the starting temperature could be adjusted upwardly somewhat if desired, with warm air, warm water, or heating frequencies of light, as desired. It is not necessary, practical or economical to cool the produce too much. The selection of a base or starting temperature for heat-shock depends on the kind of produce and its specific reaction to the heat-shock environment Having established a base temperature, the lettuce is placed into approximately 122 degrees Fahrenheit water for 60–120 seconds to warm the tissue and cause the desired heat-shock effect. This immersion warms the lettuce to approximately 114 degrees Fahrenheit while the tissue adsorbs/absorbs about eight percent water by weight. The lettuce is then placed in a vacuum chamber, such as described in the above-stated U.S. Pat. No. 5,992,169. The vacuum pump is activated and the sub-atmospheric pressure inside the chamber is reduced to about 4.7 mm of mercury. This reduction in pressure effects evaporation of the aforesaid eight percent absorbed/adsorbed water, while concomitantly reducing the temperature of the produce to the desired temperature of approximately 33 degrees Fahrenheit.

As another example, consider fresh-cut Red or Green Leaf lettuce that arrives at the processing facility with a tissue temperature of 45 degrees Fahrenheit. The lettuce is treated with water at a temperature of about 70 degrees Fahrenheit until the tissue temperature reaches approximately 65 degrees, effecting the desired heat-shock. At this time the tissue will have absorbed/adsorbed about three percent moisture and can be transferred to the vacuum chamber for cooling and drying, as described above.

To treat and cool fresh cut potatoes, the potatoes are first immersed in water with a suitable anti-browning agent, and then transferred to vacuum cooling/rinse water with a temperature of about 155 degrees Fahrenheit. The potatoes are retained in the water until the tissue temperature reaches about 155 degrees Fahrenheit, to effect the desired heat-shock. This water immersion adds about twelve percent by weight of water to the cut potatoes. Thereafter, the potatoes are cooled in a vacuum chamber, as aforementioned, by reducing the pressure inside the chamber to a vacuum pressure corresponding to a desired evaporation point, preferably to a pressure of about 4.7 mm of mercury, which is the pressure that corresponds to evaporating 33 degrees Fahrenheit water. In this step, more than twelve percent by weight of water is removed from the potatoes, leaving the potato tissue slightly dry to minimize biotic growth during shipment and storage.

Water treatment of produce to attain the heat-shock reaction may cause more water to be adsorbed/absorbed than can be removed by vacuum pressure in a one-step reduction to sub-atmospheric pressure. One solution is to form a vacuum within a chamber, then release the vacuum while directing the incoming air to blow surface water from the produce tissue. This use of incoming air to blow surface water from the tissue could also be used to warm the tissue (add BTU's), thereby facilitating additional moisture to be evaporated in a subsequent vacuum evaporation/cooling cycle without risking freeze damage. This use of incoming air may be repeated through additional cycles as necessary to obtain the desired moisture content and desired temperature of the produce. This rewarming may also serve to repeat or augment the heat shock process. For example, after a preheat-shock temperature adjustment (if needed), produce such as Iceberg lettuce may be introduced to 90 degrees Fahrenheit water for 60–120 seconds, raising its temperature to 85 degrees Fahrenheit, resulting in an approximately eight percent by weight adsorption/absorption of water on and in its tissue. The cooling and drying process may be as follows: The produce is loaded into a vacuum chamber as aforementioned and the pressure reduced to 5.17 mm of mercury (the pressure that corresponds to evaporating 35 degrees Fahrenheit water), to evaporate about five of the eight percent of the added water. The sub-atmospheric pressure then could be released for a time with the incoming air blowing one percent of the moisture off the produce while warming the produce tissue to 55 degrees Fahrenheit. At this time, the vacuum pressure is reestablished, to bring the vacuum chamber to 4.7 mm of mercury pressure and removing the remaining two percent of the added eight percent water. Alternatively, the release of vacuum pressure might be allowed to raise the produce tissue temperature higher, allowing for a slight drying of the produce for storage and marketability reasons.

Alternatively, excess water adhering to the surface of the processed lettuce could be removed by conventional centrifuge or by air pressure outside the vacuum chamber before vacuum cooling and drying.

As another alternative, temperature adjusted lettuce is placed in a tray or basket and loaded into a vacuum chamber as aforementioned. Water at a temperature in the range of about 50 degrees Fahrenheit to about 160 degrees Fahrenheit is then delivered into the chamber and onto the produce, to cause the heat-shock response. The warm water is removed from the chamber and pressurized air may be used to remove excess water. The pressure inside the chamber is reduced to 4.7 mm of mercury and the produce is held at this pressure until the lettuce is cooled to 33 degrees Fahrenheit and the desired amount of water remains in the lettuce. The lettuce is then ready for packaging.

In another alternative, water vapor with a temperature between 50 degrees Fahrenheit and 212 degrees Fahrenheit is applied to produce tissue inside or outside a vacuum chamber to heat-shock the produce. This vapor condenses evenly on the produce while delivering the necessary heat-shock. This water vapor delivery prevents excessive water adsorption, and the produce is then cooled in the vacuum cooling/drying procedure, as described above.

In another alternative, broccoli may be sprayed with or immersed in 122 degree Fahrenheit, or higher, water for a time sufficient to cause the heat-shock reaction. This broccoli can thereafter be quenched, cooled and dried by chilled water and centrifuging, or by chilled air alone. However, if the broccoli is to be vacuum cooled and dried pursuant to the procedures of the present invention, the broccoli may need to be cooled in several steps or stages. In each step or stage, cooling water is applied to the broccoli, the broccoli is then vacuum cooled to a given temperature. Water is applied again, and the broccoli is again vacuum cooled. These steps are repeated until the broccoli reaches the desired temperature.

In some circumstances it is necessary to treat the produce with pesticides, as in the case of certain export shipments. This can be readily and effectively accomplished in conjunction with the procedure of the present invention. For example, after the heat-shock treatment, and following the vacuum cooling/drying procedure, when the vacuum is released, the gas introduced into the vacuum chamber can be, or can include, an insecticide or other active gas. Similarly, the gas can, if desired, include nitrogen or other inert gases, with or without a pesticide or other active gas. Obviously, a pesticide could be applied during other phases of the procedure, for example, as part of the heat-shock or preheat-shock process.

BRIEF DESCRIPTION OF THE DRAWINGS

The invention can better be understood by reference to the drawings in which:

FIG. 2A provides heat balance calculations for water removal by vacuum cooling; and FIG. 2B provides heat balance calculations for water removal by vacuum cooling.

DETAILED DESCRIPTION OF A PREFERRED EMBODIMENT

Figure 1:
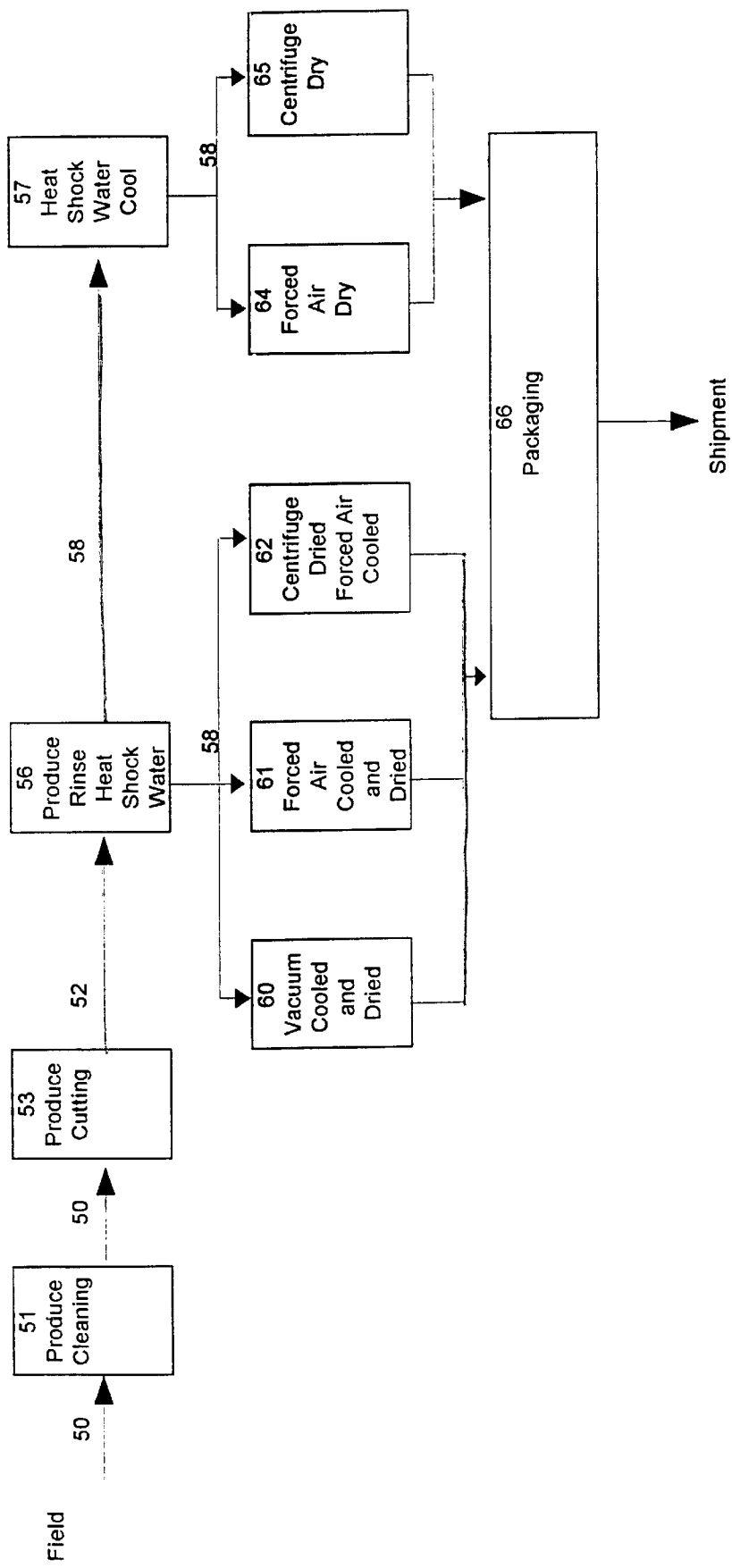
FIG. 1 is a schematic diagram of an embodiment of a process to heat shock, cool and dry produce.

In FIG. 1, harvested lettuce is placed in bins or containers and transported to a processing facility. In area 51, damaged parts of the produce are removed. At station 54, the temperature of the produce is adjusted to a desired level, if necessary, to assure a consistent heat shock response. The produce passes to processing area 53 where the produce is chopped, shredded or subdivided. The produce passes to chamber 56 where it is rinsed with warm water to cause the heat shock reaction. The produce is then transferred to vacuum cooler/drier 60, or forced air chiller/dryer 61, or centrifuge dryer/forced air cooler 62. Alternatively, the produce can be transferred to cold water bath 57 to attain a desired temperature, then moved to forced air drying 64 or centrifuge drying 65, to remove excess water, leaving the produce with the desired water content and at a desired temperature. The lettuce is then transported to packaging 66.

Alternatively, an anti-browning agent could be added to heat shock water 56 or heat shock quench water 57. Then the lettuce would be transferred to vacuum cooling and drying 60.

Having described the present invention and illustrated it with a number of examples, various modifications and variations will be apparent to those familiar with this art. Such variations and modifications as are embraced by the spirit and scope of the appended claims are contemplated as being within the purview of the present invention.

What is claimed is:

1. In the method of processing and preserving produce, the steps of:
   (a) heat-shocking the produce by contacting the produce with water at a relatively elevated temperature compared with the produce starting temperature, to elevate the temperature of the produce, and (b) vacuum evaporating at least a portion of excess adsorbed/absorbed water from step (a) to dry and cool the produce to a desired water content and temperature.

2. In the method of claim 1 wherein said produce is a leafy vegetable.

3. In the method of claim 1 wherein said produce is lettuce, and in step (a) the temperature of the produce is elevated to about 18° F. above said starting temperature and continues at the elevated temperature for about 30 to 480 seconds.

4. In the method of claim 3 wherein in step (b) the produce is cooled to a temperature of about 34 to 41° F.

5. In the method of claim 3 wherein in step (a) the elevated temperature of the produce is less than about 140° F.

6. In the method of processing and preserving produce, the steps of:
   (a) heat-shocking the produce by contacting the produce with water at a relatively elevated temperature compared with the produce starting temperature, to elevate the temperature of the produce, (b) vacuum evaporating at least a portion of excess adsorbed/absorbed water from step (a) to dry and cool the produce to a desired water content and temperature, and (c) releasing the vacuum of step (b) with a gas.

7. In the method of claim 6 wherein the gas of step (c) includes an insecticide.

8. In the method of claim 6 wherein the gas of step (c) includes nitrogen and/or another inert gas.

9. In the method of claim 6 wherein the gas of step (c) includes nitrogen and/or another inert gas, and an insecticide.

10. In the method of processing and preserving produce, the steps of:
    (a) treating the produce by contacting the produce with water at a relatively elevated temperature compared with the produce starting temperature, and (b) vacuum evaporating at least a portion of excess adsorbed/absorbed water from step (a) to dry and cool the produce to a desired water content and temperature.

11. In the method of claim 10 wherein said produce is a leafy vegetable.

12. In the method of claim 10 wherein said produce is lettuce.

13. In the method of claim 12 wherein in step (b) the produce is cooled to a temperature of about 34 to 41° F.

14. In the method of claim 12 wherein in step (a) the elevated temperature of the produce is less than about 140° F.

15. In the method of processing and preserving produce, the steps of:
    (a) treating the produce by contacting the produce with water at a relatively elevated temperature compared with the produce starting temperature, (b) vacuum evaporating at least a portion of excess adsorbed/absorbed water from step (a) to dry and cool the produce to a desired water content and temperature, and (c) releasing, at least in part, the vacuum of step (b) with a gas.

16. In the method of claim 15 wherein the gas of step (c) includes an insecticide.

17. In the method of claim 15 wherein the gas of step (c) includes nitrogen and/or another inert gas.

18. In the method of claim 15 wherein the gas of step (c) includes nitrogen and/or another inert gas, and an insecticide.

19. In the method of processing and preserving produce, the step of: (a) treating the produce by contacting the produce with water containing an anti-browning agent, and heat-shocking the produce by contacting the produce with water at a relatively elevated temperature compared with the produce starting temperature, to elevate the temperature of the produce, and (b) vacuum evaporating at least a portion of excess adsorbed/absorbed water from step (a) to dry and cool the produce to a desired water content and temperature.

20. In the method of claim 19 wherein said produce is cut potatoes or apples.

21. In the method of claim 19 wherein said produce is cut potatoes or apples, and in step (a) the temperature of the produce is elevated to at least about 18° F. above said starting temperature and continues at the elevated temperature for about 30 to 480 seconds.

22. In the method of claim 21 wherein in step (b) the produce is cooled to a temperature of about 34 to 41° F.

23. In the method of claim 21 wherein in step (a) the elevated temperature of the produce is less than about 140° F.

24. In the method of processing and preserving produce, the steps of:
    (a) heat-shocking the produce by contacting the produce with water at a relatively elevated temperature compared with the produce starting temperature, to elevate the temperature of the produce, and (b) vacuum evaporating at least a portion of excess adsorbed/absorbed water from step (a) to dry and cool the produce.

25. In the method of processing and preserving produce, the steps of:
    (a) heat-shocking the produce by contacting the produce with water at a relatively elevated temperature compared with the produce starting temperature, to elevate the temperature of the produce, (b) vacuum evaporating at least a portion of excess adsorbed/absorbed water from step (a) to dry and cool the produce, and (c) releasing the vacuum of step (b) with a gas comprising an inert gas.

26. In the method of claim 25 wherein the gas of step (c) includes an insecticide.

27. In the method of processing and preserving produce, the steps of:
    (a) treating the produce by contacting the produce with water at an elevated temperature, and (b) vacuum evaporating at least a portion of excess adsorbed/absorbed water from step (a) to dry and cool the produce.

28. In the method of processing and preserving produce, the steps of:
    (a) treating the produce by contacting the produce with water at an elevated temperature, (b) vacuum evaporating at least a portion of excess adsorbed/absorbed water from step (a) to dry and cool the produce, and (c) releasing the vacuum of step (b) with a gas comprising an inert gas.

29. In the method of claim 28 wherein the gas of step (c) includes an insecticide.

30. A method for delivering produce at a desired temperature and a desired moisture content comprising:
    subjecting said produce to water at a temperature and for a time sufficient to cause the heat shock preservation response, then cooling and drying said produce to a desired temperature in the range of about 33° F. to about 41° F. without substantial loss of interstitial moisture.

31. The method of claim 30 wherein said heat shock response is effected by applying to said processed produce water at a temperature at least about 18° F. higher than the temperature of said produce at the outset of said heat shock step, then reducing the temperature of the produce after the heat shock response has taken place to a temperature in the range of about 33° to about 41° F.

32. The method of claim 30 wherein said produce is chopped, cut or shredded before said subjecting step.

33. The method of claim 31 wherein said produce is chopped, cut or shredded before said subjecting step.

34. The method of claim 30 wherein, after said heat shock response step, the processed produce is vacuum cooled while a gas is blown across the surface of the produce to remove water.

35. The method of claim 31 wherein after said heat shock response step, the processed produce is vacuum cooled while a gas is blown across the surface of the produce to remove water.

36. The method of claim 32 wherein after said heat shock response step, the processed produce is vacuum cooled while a gas is blown across the surface of the produce to remove water.

37. The method of claim 33 wherein after said heat shock response step, the processed produce is vacuum cooled while a gas is blown across the surface of the produce to remove water.

38. The method of claim 30 wherein said produce is fresh, leafy lettuce.

39. The method of claim 31 wherein said produce is fresh, leafy lettuce.

40. The method of claim 32 wherein said produce is fresh, leafy lettuce.

41. The method of claim 33 wherein said produce is fresh, leafy lettuce.

42. The method of claim 34 wherein said produce is fresh, leafy lettuce.

43. The method of claim 35 wherein said produce is fresh, leafy lettuce.

44. The method of claim 36 wherein said produce is fresh, leafy lettuce.

45. The method of claim 37 wherein said produce is fresh, leafy lettuce.

46. A method for delivering lettuce at a desired temperature and a desired moisture content comprising:
   controlling the temperature of said lettuce at a desired temperature;
   subjecting said lettuce to heat shock;
   vacuum cooling said lettuce to a desired temperature.

47. A method for delivering broccoli at a desired temperature and a desired moisture content comprising:
   controlling the temperature of said broccoli at a desired temperature;
   subjecting said broccoli to heat shock;
   vacuum cooling said broccoli to a desired temperature.

48. A method for delivering cut potatoes at a desired temperature and a desired moisture content comprising:
   (a) subjecting said cut potatoes to an anti-browning agent;
   (b) subjecting said cut potatoes to water at an elevated temperature to increase their moisture content and heat shock them; and
   (c) vacuum cooling said cut potatoes to a desired temperature while removing at least a portion of the decreased moisture content added during step (b).

49. A method of delivering lettuce at a desired temperature and a desired moisture content comprising:
   controlling the temperature of said lettuce at a desired temperature;
   subjecting said lettuce to heat shock;
   vacuum cooling said lettuce to a desired temperature; and
   cooling said lettuce to a desired temperature.

50. A method for delivering broccoli at a desired temperature and a desired moisture content comprising:
   controlling the temperature of said broccoli at a desired temperature;
   subjecting said broccoli to heat shock;
   vacuum cooling said broccoli to a desired temperature; and
   cooling said broccoli to a desired temperature.

51. A method for delivering cut potatoes at a desired temperature and a desired moisture content comprising:
   (a) subjecting said cut potatoes to water containing an anti-browning agent and to increase their moisture content; and
   (b) applying a reduced pressure to said cut potatoes to remove at least part of the water added to said cut potatoes in step (a) and to cool said cut potatoes to a desired temperature.

52. A method for delivering produce at a desired temperature and a desired moisture content comprising;
   controlling the temperature of said produce at a desired temperature;
   subjecting said produce to heat shock;
   cooling said produce to a desired temperature and a desired moisture content.

53. A method of cooling field-harvested produce, comprising the steps:
   placing produce in a vacuum chamber;
   discharging a first amount of water onto the produce;
   forming a partial vacuum in the vacuum chamber by reducing the internal pressure of the vacuum chamber to a first pressure level that is lower than the atmospheric pressure outside the pressure chamber, said first pressure level being below or near a pressure that causes the discharged water to vaporized;
   chilling the air inside the vacuum chamber to a temperature sufficient to cause condensation and collecting the condensate in a way that limits condensate dripping on the produce;
   adjusting the temperature of the water to be applied to the produce;
   discharging a second amount of temperature-adjusted water onto the produce; and
   adjusting the pressure inside the chamber to a second pressure level that is lower than the atmospheric pressure outside the pressure chamber, said second pressure level being below or near a pressure that causes the discharged water to vaporized.

54. The method of claim 53, wherein the second pressure level is near or about the first pressure level.

55. The method of claim 53, wherein the second pressure level is less than the second pressure level.

56. The method of claim 53, wherein the step of discharging a first amount of water occurs during the step of forming a partial vacuum.

57. The method of claim 53, wherein the step of discharging a second amount of water occurs during the step of adjusting the pressure inside the chamber to a second pressure level.

58. The method of claim 53, further comprising permitting outside air to enter the chamber in a controlled fashion so as to limit the removal of interstitial water from the produce.

59. The method of claim 53, wherein the step of adjusting the temperature of the water comprises adjusting the temperature of the water to be applied to the produce by passing the water through a heat exchanger to warm the water.

* * * * *